(12) United States Patent
Koren et al.

(10) Patent No.: US 6,375,342 B1
(45) Date of Patent: Apr. 23, 2002

(54) ILLUMINATED WATERFALL

(75) Inventors: Pinhas Paul Koren; Laurie Beth Bernota, both of Altamonte Springs, FL (US)

(73) Assignee: Oasis Waterfalls LLC, Orlando, FL (US)

( * ) Notice: Subject to any disclaimer, the term of this patent is extended or adjusted under 35 U.S.C. 154(b) by 0 days.

(21) Appl. No.: 09/630,500

(22) Filed: Aug. 2, 2000

Related U.S. Application Data
(60) Provisional application No. 60/190,432, filed on Mar. 17, 2000.

(51) Int. Cl.[7] ............................. F21V 8/00; F21V 33/00
(52) U.S. Cl. ........................ 362/562; 362/96; 362/565; 362/806; 239/18
(58) Field of Search ................................ 362/559, 562, 362/565, 576, 581, 96, 101, 318, 806; 239/18–20; 385/33, 34

(56) References Cited

U.S. PATENT DOCUMENTS

| | | | | |
|---|---|---|---|---|
| 4,749,126 A | * | 6/1988 | Kessener et al. | 362/96 |
| 4,901,922 A | * | 2/1990 | Kessener et al. | 362/562 |
| 6,076,741 A | * | 6/2000 | Dandrel et al. | 239/18 |
| 6,132,056 A | * | 10/2000 | Ruthenberg | 362/96 |
| 6,149,070 A | * | 11/2000 | Hones | 239/18 |
| 6,269,491 B2 | * | 8/2001 | Zankow | 239/18 |

OTHER PUBLICATIONS

"FiberFall®–Where Light enters Water"; two–sided color brochure distributed by Florida Falls, 10453 Tillery Road, Spring Hill, Florida 34608.
"Introducing Fiberstars® Falls by Fiberstars"; two–sided color brochure distributed by Fiberstars, 2883 Bayview Drive, Freemont, CA 94538.
WaterFall Installation Manual and Design Guide–©Oasis Falls 1998.
1999 Waterfall Catalog; Distributed by Oasis™ Falls International, 210 S. Magnolia, Sanford, FL 32771.

* cited by examiner

*Primary Examiner*—Alan Cariaso
(74) *Attorney, Agent, or Firm*—Beusse, Brownlee, Bowdoin & Wolter, P.A.; David G. Maire

(57) ABSTRACT

A waterfall illuminated by a plurality of optical fibers having their ends disposed along an underside of the edge of the waterfall and directing light downward from the fiber ends onto the surfaces under the waterfall. A fiber optic cable bundle is directed within a fiber conduit along the edge of a generally rectangular water conduit, with the individual fiber ends projecting through respective holes formed in an underside of the fiber conduit. The water and fiber conduits may be located between a wall of a pool or spa and the surrounding coping, with both water and fiber connections being made from the rear portion of the device.

18 Claims, 1 Drawing Sheet

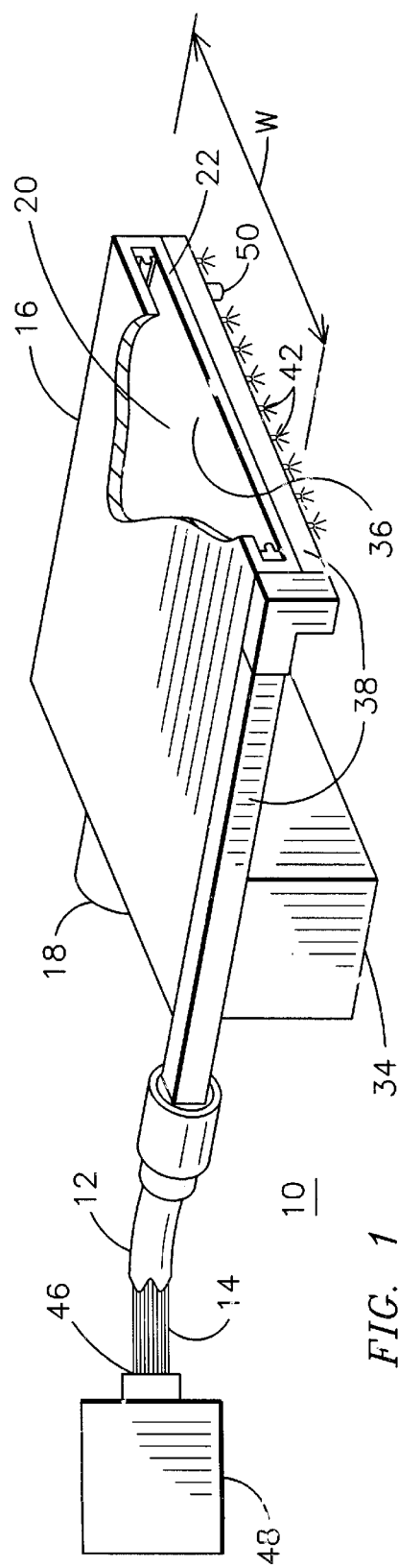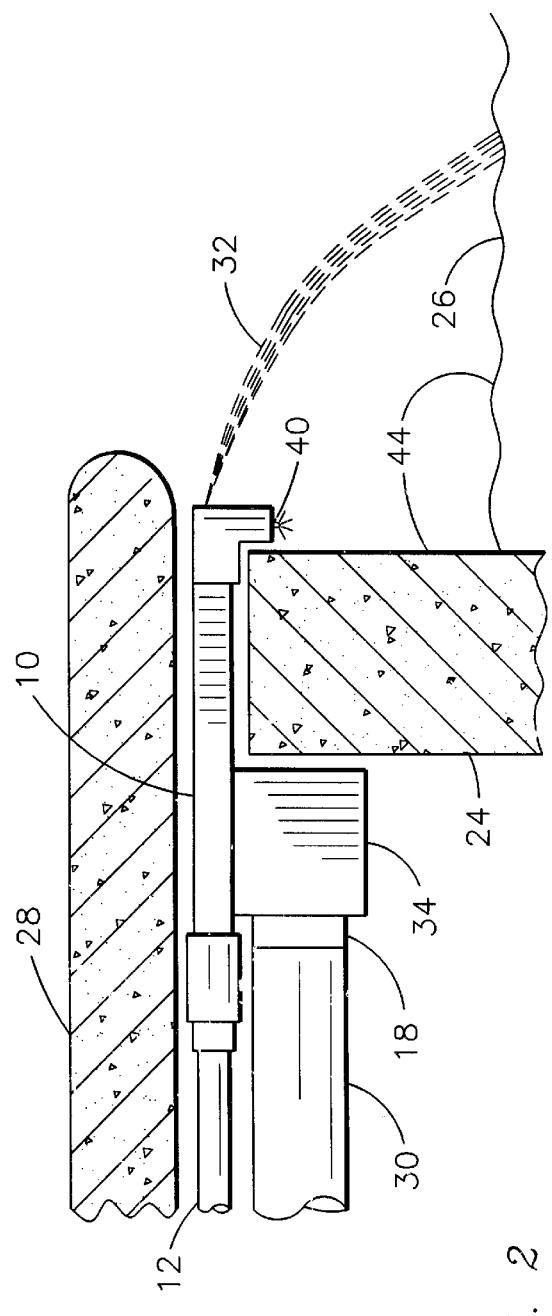

ILLUMINATED WATERFALL

This application claims the benefit of the Mar. 17, 2000, filing date of United States provisional patent application serial no. 60/190,432.

FIELD OF THE INVENTION

This invention relates generally to the field of fiber optic lighting, and more specifically to a method and apparatus for illuminating a waterfall for a pool or spa with a fiber optic light source.

BACKGROUND OF THE INVENTION

It is known to use a fiber optic light source to provide illumination for portions of a pool or water spa. Fiber optic cables are small and flexible and can be used to deliver light to locations that are impractical for other light sources. Importantly, the light source and its related electrical components can be located at a safe distance from the pool or spa water.

It is known to illuminate a waterfall of a pool or spa with fiber optic light. One such device uses a fiber optic cable bundle to provide light to an acrylic bar disposed along the edge of a waterfall. Light emanates from along the length of the acrylic bar and illuminates the water as it flows over the bar to form the waterfall. Another known device provides light from a side emitting fiber disposed along an edge of a waterfall. The side emitting fiber is installed into a waterfall structure and is provided with light from the end of an end emitting delivery fiber connected to the waterfall structure. However, the intensity of the light provided by these known devices is limited by the efficiency of the light transfer mechanisms used. Furthermore, the width of the waterfall must necessarily be limited in order not to reduce the intensity of the light, and in order not to produce a noticeable difference in intensity from one side of the waterfall to the other. For example, the devices described above are believed to be available for waterfalls up to only 24 inches wide.

SUMMARY OF THE INVENTION

Thus there is needed a method and apparatus for illuminating a waterfall that provides a high intensity light and that is capable of illuminating a waterfall greater than 24 inches wide.

Described herein is a waterfall apparatus comprising a generally rectangular shaped water conduit having an inlet for receiving water into the interior of the water conduit and having an outlet edge for producing a waterfall as the water flows out of the water conduit; a fiber optic cable bundle attached to the water conduit, the fiber optic cable bundle comprising a plurality of fibers, each fiber adapted to receive light at an input end and to emit light at an output end; wherein the output ends of the respective fibers are disposed proximate the outlet edge of the water conduit.

Also described herein is a method of illuminating a waterfall, the method comprising the steps of providing a plurality of optical fibers, each fiber operable to receive light at an input end and to emit light at an output end; disposing the output ends of the respective fibers along an underside of a waterfall; and providing light into the input ends of the respective fibers.

BRIEF DESCRIPTION OF THE DRAWINGS

FIG. 1 is a perspective view of a waterfall apparatus having a plurality of end emitting fibers disposed along an underside of an outlet edge of a water conduit.

FIG. 2 is an elevation view of the waterfall apparatus of FIG. 1 as it may be installed in a pool.

DETAILED DESCRIPTION OF THE INVENTION

FIG. 1 illustrates a waterfall apparatus 10 illuminated by a fiber optic cable bundle 12 containing a plurality of individual fibers 14. The waterfall apparatus 10 includes a generally rectangular shaped water conduit 16 having an inlet 18 for receiving water into the interior 20 of the water conduit 16, as can be seen in the cut-away portion of FIG. 1. The water conduit 16 also has an outlet edge 22 for producing a waterfall as the water flows out of the water conduit 16.

The waterfall apparatus 10 is formed to include an enclosed water conduit 16 in order to facilitate its installation into a pool or spa structure, as illustrated in FIG. 2. A wall 24 forms a water barrier for a pool of water 26. The water conduit 16 is disposed on top of wall 24 and is formed of metal or other material capable of bearing the weight of the concrete coping 28 or other decking material surrounding the pool of water 26. The inlet 18 of the water conduit 16 is connected to water supply pipe 30 for providing water to the waterfall 32. As is known in the art, the water used for the waterfall may be recycled from the pool of water 26. The water may be directed from the inlet 18 into a water distribution apparatus 34, as may be seen in both FIGS. 1 and 2. The water distribution apparatus 34 helps to direct a laminar flow of water to the outlet edge 22 in order to provide an attractive waterfall effect. In other embodiments, the water conduit 16 need not be a closed structure, but rather may include only a bottom plate 36 for conveying the water along its upper surface from the inlet 18 to the outlet edge 22. The bottom plate 36 may be flat or may have a curved surface to help to direct the flow of water. Conduit 16, plate 36 and similar structures may be referred to collectively as water directing structures.

Fiber optic cable bundle 12 is enclosed within a fiber conduit 38 attached to a side portion of water conduit 16 and extending along an underside of outlet edge 22. A plurality of holes 40 are formed along the underside of fiber conduit 38, and the output ends 42 of the respective individual fibers 14 are disposed in or through the holes 40 to direct light downward onto surfaces 44 located under the waterfall 32. Advantageously, light emitted from the fiber ends 42 illuminates the surface of the wall 24 and the pool of water 26 under the waterfall 32. The applicant has found that such illumination provides a pleasing glow and lighting effect as the bubbles and currents formed in the pool of water 26 by the action of the waterfall 32 reflects and refracts the light back to the observer. The input ends 46 of the fibers 14 may be connected to a light source 48, as is known in the art, for providing white light or light of one or more predetermined wavelengths.

The fibers 14 may be of a design known in the art to emit light from their ends, such as the End-Glow™ cables sold by Super Vision International, Inc. The width W of the water fall is not limited by the capability of an individual side glow cable nor by the efficiency of an acrylic tube. Furthermore, light may be provided from the ends of optical fibers without passing through additional connectors associated with the waterfall structure. Any desired width W may be illuminated by incorporating an appropriate number of fibers into the waterfall apparatus 10 as necessary to achieve a desired light intensity. For very wide waterfalls, it may be desirable to provide a fiber conduit 38 and fiber bundle 12 on both sides of water conduit 16 in order to reduce the diameter of the bundle 12. Furthermore, it may be desirable to direct a portion of the fiber output ends 42 in a direction other than straight downward in order to varying illumination effects for different applications. Moreover, different individual fibers 14 may be provided with light of a different wavelength or a changing wavelength to provide a desired effect. A lens 50 may be positioned near one or more of the fiber output ends to further enhance a desired effect.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A waterfall apparatus comprising:
    a water conduit having an inlet for receiving water into the interior of the water conduit and having an outlet edge for producing a waterfall as the water flows out of the water conduit;
    a fiber optic cable bundle attached to the water conduit, the fiber optic cable bundle comprising a plurality of fibers, each fiber adapted to receive light at an input end and to emit light at an output end;
    wherein the output ends of the respective fibers are disposed proximate the outlet edge of the water conduit, and further comprising:
        a fiber conduit having a top portion attached to the underside of the water conduit proximate the outlet edge and operable to contain the fiber optic cable bundle;
        a plurality of holes formed along an underside of the fiber conduit;
    wherein the output ends of the fibers are disposed in respective ones of the plurality of holes.

2. The waterfall apparatus of claim 1, wherein the outlet ends are positioned to direct light downward.

3. The waterfall apparatus of claim 1, further comprising a portion of the fiber conduit extending along a side of the water conduit and having an end for insertion of the fiber optic cable bundle proximate a rear portion of the water conduit.

4. The waterfall apparatus of claim 3, wherein the inlet of the water conduit comprises a pipe connection disposed proximate the rear portion of the water conduit.

5. The waterfall apparatus of claim 1, further comprising a light source connected to the fiber optic cable bundle and operable to direct light into the input ends of the plurality of fibers.

6. The waterfall apparatus of claim 1, wherein the water conduit is generally rectangular in shape.

7. A waterfall apparatus comprising:
    a water conduit having an inlet for receiving water into the interior of the water conduit and having an outlet edge for producing a waterfall as the water flows out of the water conduit;
    a fiber optic cable bundle attached to the water conduit, the fiber optic cable bundle comprising a plurality of fibers, each fiber adapted to receive light at an input end and to emit light at an output end;
    wherein the output ends of the respective fibers are disposed proximate the outlet edge of the water conduit;
    further comprising a lens located proximate at least one of the output ends of the respective fibers.

8. A waterfall apparatus comprising:
    a water conduit having an inlet for receiving water into the interior of the water conduit and having an outlet edge for producing a waterfall as the water flows out of the water conduit;
    a fiber optic cable bundle attached to the water conduit, the fiber optic cable bundle comprising a plurality of fibers, each fiber adapted to receive light at an input end and to emit light at an output end;
    wherein the output ends of the respective fibers are disposed proximate the outlet edge of the water conduit;
    wherein the outlet ends of the respective fibers are disposed along an underside of the water conduit proximate the outlet edge.

9. A waterfall apparatus comprising:
    a plate having an inlet for receiving water to flow along an upper surface of the plate and an outlet edge for producing a waterfall as the water flows off the plate;
    a fiber optic cable bundle comprising a plurality of fibers, each fiber adapted to receive light at an input end and to emit light at an output end;
    wherein the output ends of the respective fibers are disposed proximate the outlet edge;
    wherein the output ends of the respective fibers are disposed along an underside of the plate proximate the outlet edge.

10. The waterfall apparatus of claim 9, further comprising:
    a fiber conduit having a top portion attached to the underside of the plate proximate the outlet edge and operable to contain the fiber optic cable bundle;
    a plurality of holes formed along an underside of the fiber conduit;
    wherein the output ends of the fibers are disposed in respective ones of the plurality of holes.

11. The waterfall apparatus of claim 10, further comprising a portion of the fiber conduit extending along a side of the plate and having an end for insertion of the fiber optic cable bundle proximate a rear portion of the plate.

12. The waterfall apparatus of claim 9, further comprising a light source connected to the fiber optic cable bundle and operable to direct light into the input ends of the plurality of fibers.

13. A waterfall apparatus comprising:
    a plate having an inlet for receiving water to flow along an upper surface of the plate and an outlet edge for producing a waterfall as the water flows off the plate;
    a fiber optic cable bundle comprising a plurality of fibers, each fiber adapted to receive light at an input end and to emit light at an output end;
    wherein the output ends of the respective fibers are disposed proximate the outlet edge;
    further comprising the outlet ends being positioned to emit light onto surfaces located under the waterfall.

14. A waterfall apparatus comprising:
    a plate having an inlet for receiving water to flow along an upper surface of the plate and an outlet edge for producing a waterfall as the water flows off the plate;
    a fiber optic cable bundle comprising a plurality of fibers, each fiber adapted to receive light at an input end and to emit light at an output end;

wherein the output ends of the respective fibers are disposed proximate the outlet edge;

further comprising a lens located proximate at least one of the output ends of the respective fibers.

15. A method of illuminating a waterfall, the method comprising the steps of:

providing a plurality of optical fibers, each fiber operable to receive light at an input end and to emit light at an output end;

disposing the output ends of the respective fibers along an underside of a waterfall; and providing light into the input ends of the respective fibers.

16. The method of claim 15, further comprising the step of positioning the respective output ends to direct light onto surfaces located under the waterfall.

17. The method of claim 15, further comprising the step of providing light of a predetermined wavelength into the input ends of the respective fibers.

18. The method of claim 15, further comprising the step of providing a lens proximate at least one of the fiber output ends.

* * * * *